United States Patent Office.

WILLIAM NEWTON MacCARTNEY, OF GLASGOW, SCOTLAND, ASSIGNOR TO JOHN CINNAMON, OF CINCINNATI, OHIO.

Letters Patent No. 114,576, dated May 9, 1871; antedated April 27, 1871.

IMPROVEMENT IN REDUCING RUBBER.

The Schedule referred to in these Letters Patent and making part of the same.

I, WILLIAM NEWTON MACUARTNEY, of Glasgow, Scotland, have invented a new and useful Process for the Reduction of India Rubber, of which the following is a specification.

Nature and Objects of the Invention.

My invention relates to a new process for the reduction and solution of India rubber and its application in the arts, and is particularly designed for the utilization of waste vulcanized rubber, such as the shreds and clippings produced in the manufacture of rubber goods.

To produce my menstruum I add to naphtha, petroleum, turpentine, or any of the ordinary solvents of crude rubber, variable proportions of natural or artificial camphor, such as camphine, camphor, oil of camphor, camphron, or any of the camphrenes or camphorates, and if necessary to facilitate the reduction I add acetic acid.

The process of making my menstruum may be by simple solution, or by passing the vapor of the ordinary solvents for crude India rubber over camphor or any of its allied substances or derivatives. I prefer the simple solution of natural camphor of commerce in petroleum spirit.

This menstruum thus prepared will make crude India rubber into a perfect solution in a shorter time than with the ordinary solvents. But my invention is more particularly intended for the reduction of waste vulcanized India rubber, or rubber having sulphur incorporated with it, and vulcanized by having been exposed to heat, in which state the ordinary solvents are powerless.

To dissolve such vulcanized rubber I steep or immerse it for a few days in petroleum, until it becomes softened by absorption of the solvent. I then cut it into small pieces by means of knives or mincing-machines, and place such small pieces of rubber in a close still with the menstruum, and apply heat with or without pressure until the rubber is dissolved.

The solution of the rubber having been effected, the solvent is passed or distilled over and condensed, and is ready for use again.

The camphor being chiefly or wholly catalytic in its action, and not passing in any appreciable quantity into the substance of the rubber, may be by proper treatment saved and used over and over again.

To make sure that all the camphor is extracted, fresh petroleum is placed in the still and passed over, bringing with it all the camphor which remained after the first distillation. This exhaustive distillation may be prolonged sufficiently to insure the complete recovery of the camphor.

The rubber when freed from all superfluous menstruum is ready to be mixed with coloring matters and sulphur for the manufacture of water-proof materials, or it can be prepared as a paint, glue, anti-fouling composition for ships' hulls, or for any of the purposes that crude rubber is used.

For the manufacture of paints or water-proofing solutions it will mix readily with fixed oils and driers, and for making soft and noiseless floor-cloths it can be mixed with cork or other wood dust, &c., and rolled upon cloth or canvas and vulcanized.

Lastly, by evaporating all the solvent the rubber may be kneaded with sulphur and made into rings, belts, and applied to all purposes for which ordinary vulcanized rubber is used.

I am aware that Daniel Spell, in patents numbered 91,377 and 97,454, described a mode of dissolving xyloidine in conjunction with India rubber and other substances, by the joint action of camphor and petroleum and one or more derivatives thereof, and of other solvents which were to "remain a part of the resultant compound," and I therefore make no claim, broadly, to the use of such solvents as new and of my invention; but—

What I do claim as new, and desire to secure by Letters Patent, is—

The process herein described of reducing vulcanized India rubber by the employment of petroleum and camphor, as set forth.

In testimony of which invention I hereunto set my hand.

WILLIAM NEWTON MacCARTNEY.

Witnesses:
THOMAS NIXON,
GEORGE BARRAS.